United States Patent
Soeda

(10) Patent No.: US 7,433,088 B2
(45) Date of Patent: Oct. 7, 2008

(54) REFERENCE WHITE PLATE DENSITY DATA ADJUSTING IMAGE READING AND FORMING APPARATUS

(75) Inventor: Yoshihisa Soeda, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 767 days.

(21) Appl. No.: 10/200,340

(22) Filed: Jul. 23, 2002

(65) Prior Publication Data
US 2003/0016398 A1 Jan. 23, 2003

(30) Foreign Application Priority Data
Jul. 23, 2001 (JP) ............................. 2001-221815

(51) Int. Cl.
H04N 1/04 (2006.01)
(52) U.S. Cl. .................. 358/474; 358/475; 358/448; 382/274; 382/167
(58) Field of Classification Search ........... 358/474, 358/475, 406, 461, 3.26, 3.27, 1.2, 448, 326, 358/327; 382/274
See application file for complete search history.

(56) References Cited

U.S. PATENT DOCUMENTS

| | | | | |
|---|---|---|---|---|
| 4,788,599 | A * | 11/1988 | Sugishima | 358/296 |
| 4,888,492 | A * | 12/1989 | Arimoto | 358/448 |
| 4,965,634 | A * | 10/1990 | Bando | 399/49 |
| 5,371,613 | A * | 12/1994 | Arimoto et al. | 358/461 |
| 5,943,141 | A * | 8/1999 | Tamura | 358/461 |
| 6,034,788 | A * | 3/2000 | Sasanuma et al. | 358/406 |
| 6,295,383 | B1 | 9/2001 | Smitt et al. | |
| 6,704,457 | B1 * | 3/2004 | Sugiura | 382/274 |
| 6,922,263 | B2 * | 7/2005 | Sone | 358/461 |
| 6,961,151 | B1 * | 11/2005 | Nara | 358/3.26 |
| 6,989,917 | B2 * | 1/2006 | Honbo | 358/475 |
| 2002/0003908 | A1 | 1/2002 | Kijima et al. | |
| 2003/0016398 | A1 | 1/2003 | Soeda | |

OTHER PUBLICATIONS

U.S. Appl. No. 09/859,501, filed May 18, 2001, pending.
U.S. Appl. No. 11/146,078, filed Jun. 7, 2005, Soeda.

* cited by examiner

Primary Examiner—Edward L. Coles
Assistant Examiner—Negussie Worku
(74) Attorney, Agent, or Firm—Oblon, Spivak, McClelland, Maier & Neustadt, P.C.

(57) ABSTRACT

An image reading apparatus, including an image sensor configured to receive light and output an image signal in accordance with image data carried in the light, an A/D converter configure to convert the image signal into a digital signal with reference to a reference voltage, and a reference white plate configured to be read so as to generate density data. Also included is a correction device configured to correct the digital signal in accordance with shading data, a reference member configured to define a readable density limit, and a detection device configured to detect a ratio of density of the reference white plate to that of the reference member as density adjustment data. The density is obtained by reading the respective reference member and reference white plate in substantially a same exposure condition. Further included is a control device configured to control the correction device to adjust the digital signal in accordance with the density adjustment data.

36 Claims, 7 Drawing Sheets

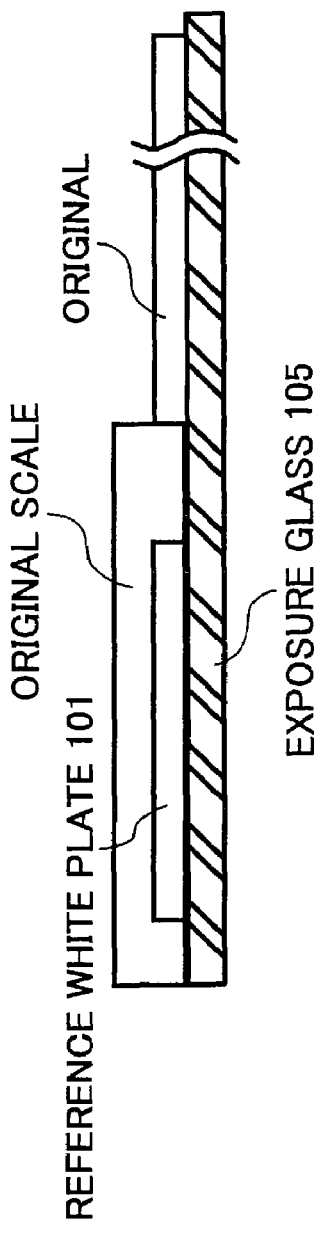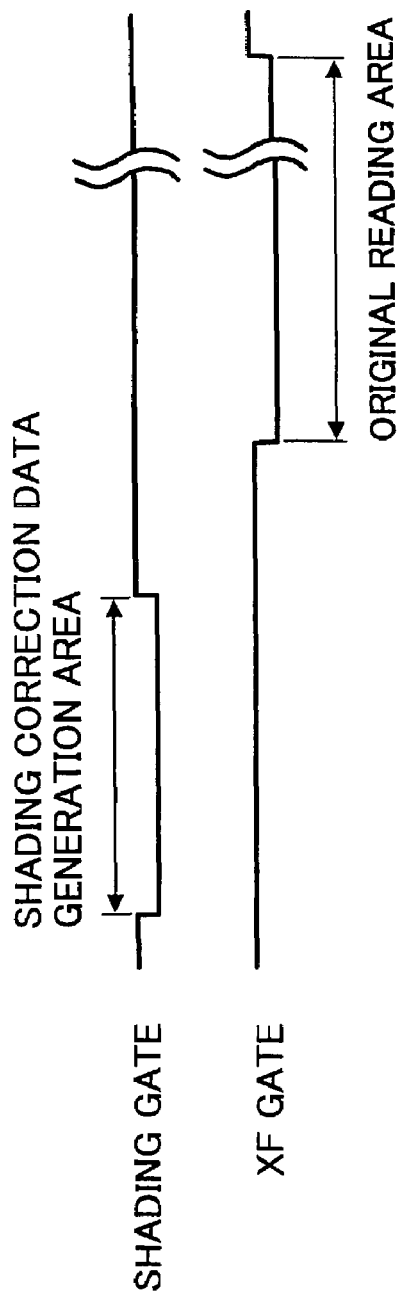

REFERENCE WHITE PLATE DENSITY DATA ADJUSTING IMAGE READING AND FORMING APPARATUS

CROSS REFERENCE TO RELATED APPLICATION

This application claims priority under 35 U.S.C. §119 to Japanese Patent Application No. 2001-221815 filed on Jul. 23, 2001, the entire contents of which are herein incorporated by reference.

BACKGROUND OF THE INVENTION

1. Field of the Invention

The present invention relates to an image reading apparatus that reads an original image with a CCD line image sensor and outputs image data to a utility instrument, for example, an image forming apparatus such as a digital copier, a facsimile, etc., after converting to and correcting a digital signal. In particular, the present invention relates to an image reading and forming apparatus capable of correcting the image data in accordance with density adjusting data obtained by comparing a density of a reference white plate with that of a reference original even when the density of the reference white plate varies.

2. Discussion of the Background Art

In a current digital copier, a CCD sensor reads an image when an optical unit is moved in a sub scanning direction perpendicular to a main scanning direction while an original image receives exposure from a light source, namely, an original surface is read. An analog image signal is obtained from the original and is then converted to a digital signal. The digital signal is then corrected in various manners. There exists a so-called shading correction that is a process for eliminating unevenness (existing in a widthwise direction of a photo acceptance unit) and for making an output from each element of the photo acceptance unit substantially the same. Such widthwise unevenness is generally caused by one of unevenness of sensitivity of each element in a CCD line image sensor and that of an amount of a transmission light through an imaging lens toward the CCD. Unevenness and degradation of an illumination optical unit can also be a cause thereof.

The shading correction process illuminates a reference white plate 101 (see FIG. 1) arranged in the vicinity of an original document setting and reading section prior to an actual reading of the original, and then reads a reflected light from the reference white plate. The shading correction process then obtains white level reference data to be used in a shading correction process for respective pixels. Then, a prescribed correction calculation is performed. Specifically, data read from the original is corrected by the correction data and also receives shading correction.

To precisely perform shading correction, a density of the reference white plate should be normalized within a standard original reading density range even if there exists density unevenness among reference white plates. Specifically, when unevenness of a density inherently existing in a reference white plate attached to an apparatus or caused by a time elapse is large, image data indicating a density is affected. As a result, a density varies even after the shading process is performed.

To resolve such a problem, the density unevenness of a reference white plate is normalized by setting a different reference potential to the A/D converter (which generally performs A/D conversion based upon a reference potential).

Specifically, even if unevenness exits, outputs after the A/D conversion are adjusted to be constant (i.e., adjusted within a standard original reading density range).

FIG. 7 illustrates an exemplary background circuit employing a system for adjusting density unevenness caused when a conventional reference white plate is used. As shown, an analog image signal read by a one-dimensional line state CCD 201 is processed by all of wave-fairing, sample holding, and amplifying signal processing circuits 202, and is then converted into digital data by the A/D converter 203. Subsequently, the digital data is input to the shading correction circuit 207.

Different reference voltages Ref1 202 and Ref2 205 are used and applied to the A/D converter 203 respectively when the reference white plate and an original are read. Specifically, a reference original is used so as to define a readable density limit as a standard that is referred to when unevenness existing in a reference white plate is adjusted and its output is normalized. A prescribed reference potential is obtained by adjustment of an adjustment device (not shown) so that an output generated when the density uneven reference white plate is read at the prescribed reference potential substantially equals that obtained when a reference original is read at Ref1. Then, such a prescribed reference potential is used as a reference potential "Ref2" of the A/D conversion when an original is actually read. Thus, different reference potentials Ref1 and Ref2 are prepared respectively when the reference white plate and original are read, and a selector 206 is required so as to alternately set one of these potentials to the A/D converter 203 when respective reading operations are performed.

However, because different reference potentials and a device for changing and selecting one of such potentials are required, a circuit is complex, parts vary, and noise is generated. In addition, the costs of the device increase (e.g., expensive parts are required when highly precise adjustment is performed).

SUMMARY OF THE INVENTION

Accordingly, an object of the present invention is to address and resolve the above-noted and other problems and to provide a novel image reading apparatus.

The above and other object are achieved according to the present invention by providing a novel image reading apparatus including an image sensor for generating an image signal, and an A/D converter for converting the image signal into a digital signal with reference to a reference voltage. A reference white plate is also included so that shading data can be obtained therefrom and a correction device reads and defines a readable density limit. Further, a detection device detects a ratio, as a density adjustment data, between density values of the reference member and reference white plate when they are read under substantially the same reading condition. A control device controls the correction device to adjust image data or shading data in accordance with the density adjustment data.

BRIEF DESCRIPTION DRAWINGS

A more complete appreciation of the present invention and many of the attendant advantages thereof will be readily obtained as the same becomes better understood by reference to the following detailed description when considered in connection with the accompanying drawings, wherein:

FIGS. 3A and 3B are diagrams illustrating read times of a reference white plate and original image in a sub scanning direction of the original image;

DETAILED DESCRIPTION OF THE PREFERRED EMBODIMENT

Figure 1:
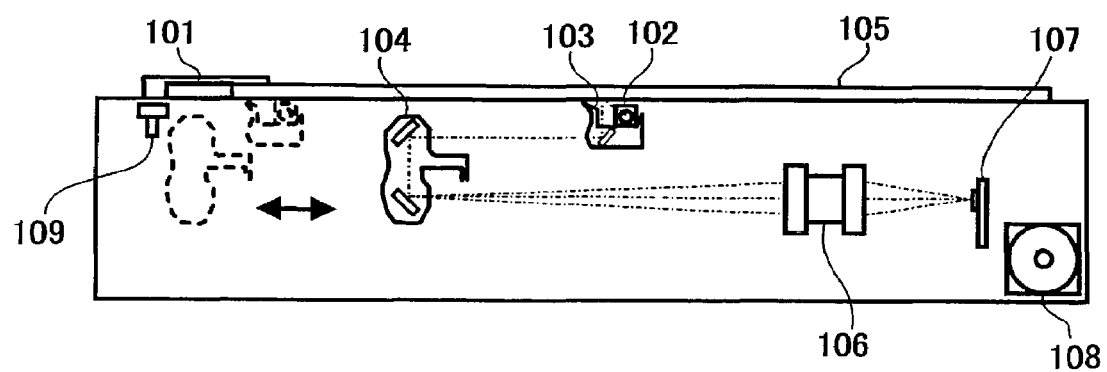
FIG. 1 is a schematic diagram for illustrating an image reading apparatus according to the present invention.

Referring now to the drawings, wherein like reference numerals designate identical or corresponding parts throughout the several views, and in particular in FIG. 1, a schematic configuration and operation of one embodiment of an image reading apparatus is illustrated. As shown, the image reading apparatus includes an original setting table 105 made of glass to which an original document (not shown) is set, a lamp 102 for illuminating the document, and a first carriage 103 mounting a first mirror for perpendicularly deflecting alight reflected from the original. The image reading apparatus also includes a second carriage 104 mounting second and third mirrors for rectangularity turning a reflection path from the first mirror.

Also shown is a lens unit 106 and a sensor board unit (SBU) 107 mounting a CCD line image sensor for performing photoelectric transfer when an original image transmitted from the second and third mirrors are imaged by the lens unit on the light path. The CCD sensor converts the image into an image signal while line sensor elements perform a main scanning in a line direction. Further, the first and second carriages 103 and 104 are moved by a scanner motor 108 in the sub scanning direction (rightward direction in FIG. 1) while maintaining a prescribed imaging condition, allowing the entire original surface to be read.

The image reading apparatus reads a reference white plate 101 and generates reference data used in a shading correction process or the like. The reference white plate 101 is arranged at a prescribed position in relation to the above-described scanning and reading 25 unit so as to be read in substantially the same condition as the original surface. Respective carriages 103 and 104 are moved by a control section (not shown) that also drives the scanning motor 108 based upon a detection signal generated by a scanner home position sensor 109 when the original document and reference white plate 101 are read. The image signal read by the CCD line image sensor is then input to an image signal processing section including the SBU 107 mounting the CCD. The image signal processing section performs analog processing, A/D conversion, and digital signal processing such as correction, adjustment, etc. Image data processed in such a manner is then output as an image formation signal to a utility apparatus such as an optical writing device that writes an image on an image bearer (PC member) when an image forming apparatus is utilized.

A configuration and operation of a circuit applying the novel adjustment and shading correction to image data in the above-described image signal processing section are now described with reference to FIG. 2. The adjustment is performed by adjusting shading data (Dsh_w(n), generally obtained by calculating and averaging outputs of the same order pixels in plural lines) generated from an output of a reference white plate in accordance with a change in a density thereof and used in a correction process such as shading correction where the following calculation is performed:

$$Dout(n)=(Din(n)/Dsh(n))\times 255 \text{ (i.e., 8 bit)}$$

where Dout(n) represents image data after receiving the shading correction, Din(n) represents image data read from an original, Dsh(n) represents shading correction data, and (n) represents a prescribed order of a pixel.

Figure 7:
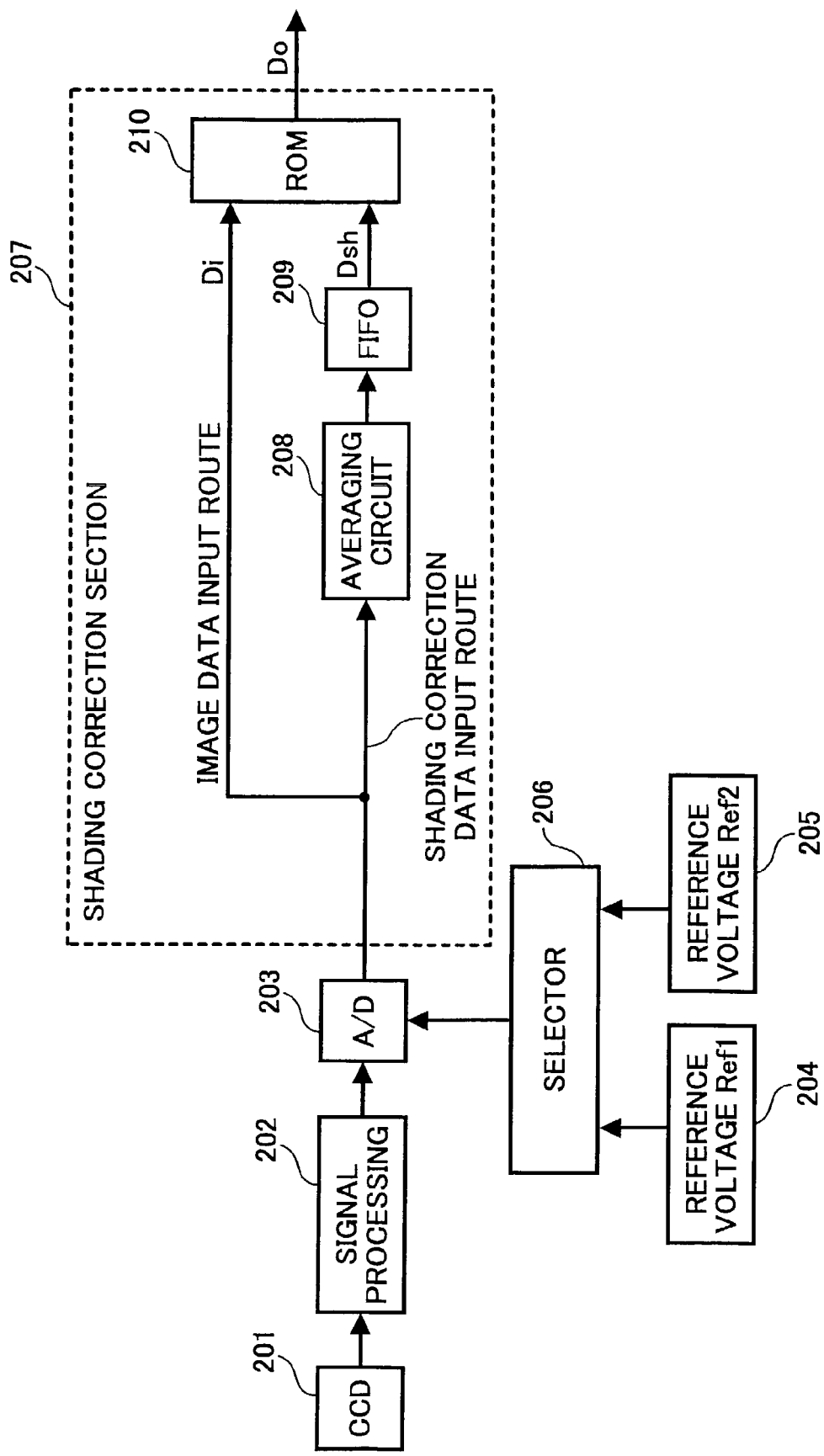
FIG. 7 is a background image signal processing section that employs a background adjustment system for adjusting density unevenness of a reference white plate.

In the past, the conventional adjustment system adjusts and alternatively sets different reference potentials to the A/D converter respectively when the reference white plate and original are read. Thus, it needs an alternating device for alternating the reference potential (see FIG. 7).

However, the present invention advantageously realizes a simple circuit configuration by adjusting shading data in accordance with a change in a density of the reference white plate without alternating such a reference voltage. For that purpose, both a reference white plate and reference original (which is a reference member defining a readable density limit) is used when unevenness existing in a reference white plate is to be adjusted so that its output can be normalized.

Specifically, a prescribed detection device detects density adjustment data from the reference white plate. Such detection is performed by applying exposure to a respective reference white plate and a reference original under substantially the same illumination conditions. In addition, reflected light enters the CCD. Further, a prescribed reference potential may be continuously set to the A/D converter. Then, the A/D converter converts image signals detected by the CCD. A detection device calculates a ratio, as density adjustment data (Dadj=Dsh_w(n)/Dsh_std(n)), between data (Dsh_w(n) and Dsh_std(n)) output from the A/D converter where Dsh_w(n) represents shading data generated from the reference white plate, and Dsh_std(n) represents shading data generated from the reference original. Also included is an adjustment device for adjusting shading correction data in accordance with the density adjustment data by calculating the following formula:

$$Dsh(n)'=Dsh(n)\times(Dsh\_std/Dsh\_w)$$

where Dsh(n)' represents shading correction data after receiving the adjusting.

Figure 2:
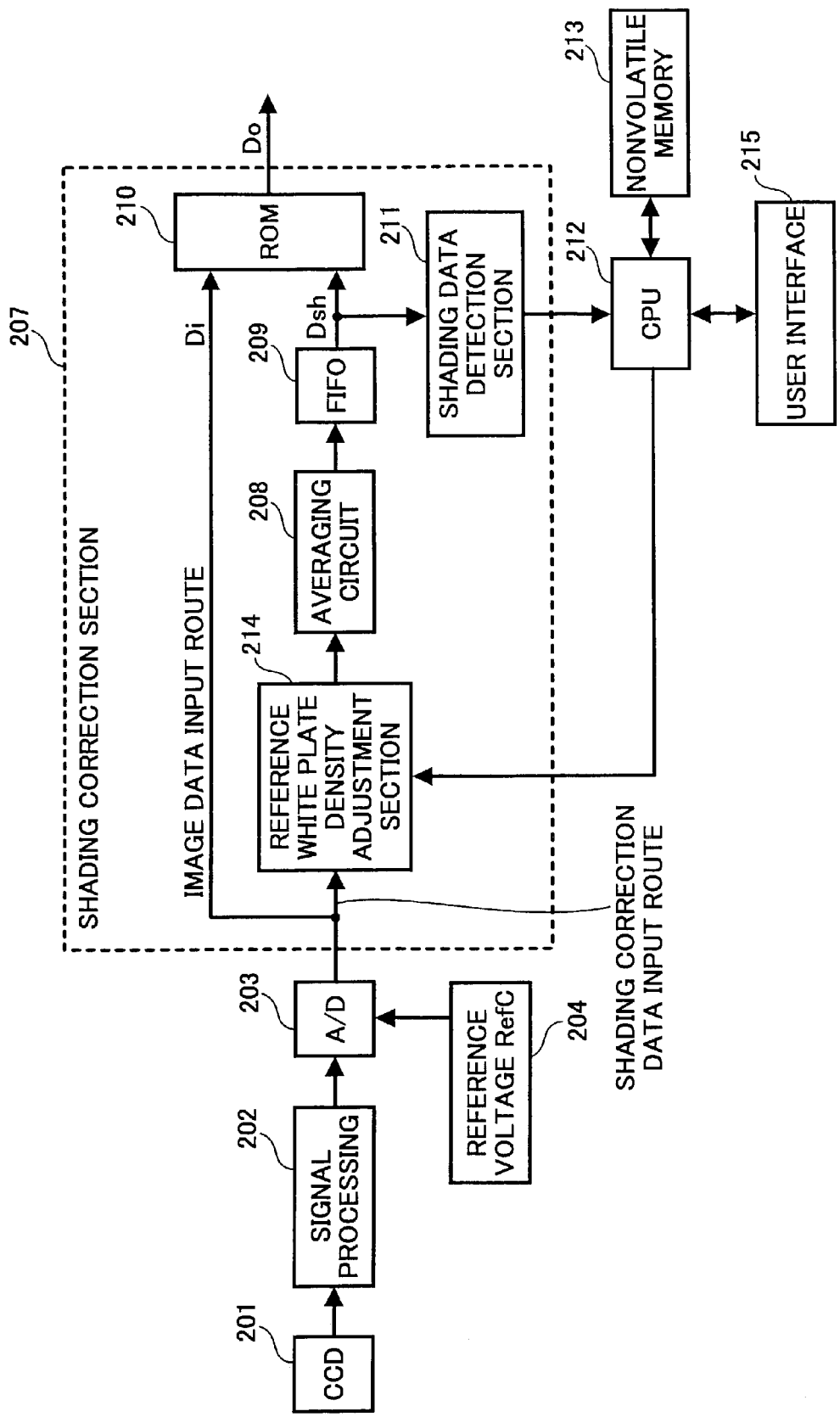
FIG. 2 is a block diagram illustrating an example an image signal processing section of the image reading apparatus of FIG. 1.

FIG. 2 is a block diagram for illustrating an image signal processing section that processes and corrects image data in accordance with a change in a density of the reference white plate. In this embodiment, an image processing section applies shading correction to digital data (i.e., shading data) converted from an analog image signal read by the CCD image sensor. As illustrated in FIG. 2, the analog image signal read by the one dimensional line state CCD 201 is processed by a signal processing circuit 202 such as a wave fairing, sample holding, and amplifying, etc. Then, the analog image signal is converted into digital data by the A/D converter 203 and is input to the shading correction circuit 207. The A/D converter 203 may not distinctively utilize a constant reference voltage Refc 204 when the reference white plate and original are read.

The shading correction circuit 207 includes a selectively used image data input route and shading correction data input route. In more detail, the shading correction data input route includes an averaging circuit 208 for averaging shading data of plural lines, for example, in a prescribed manner, and a FIFO (first in first out) 209 for storing the averaged shading data. In addition, a ROM operable in accordance with read data Di and data input from the FIFO 209 is provided so as to perform shading correction. When the reference white plate is read to obtain shading correction data, the shading correction data input route is selected. Further, when a proper original image is read, read data Di and shading correction data Dsh per pixel are input to the ROM 210 from the image data input route and the FIFO 209, respectively. A calculating process is then performed by a look up table system, i.e., using a shading correction calculation formula stored in the ROM 210. Data Do is then generated and output from the ROM 250 after performing the shading correction calculation in accordance with the values Di and Dsh.

Turning now to FIGS. 3A and 3B, which are diagrams illustrating read times of a reference white plate and original image in a sub scanning direction. As illustrated in FIGS. 3A and 3B, a period when a shading gate is "L" may be set when the reference white plate is read. The shading correction data input route may be selected during the period. When the shading gate is negated from "L" to "H", shading correction data may be fixed and is then stored in the FIFO 209.

Further, a period when XFGATE is "L" may be set when an original is read. During the period, original reading data Di from the data input route, and shading correction data Dsh generated per pixel from the FIFO 209 may be input to the ROM 210. The lookup table system may then calculate using the shading correction calculation formula stored in the ROM 210, and thereby generating data "Do" in accordance with Di and Dsh.

One embodiment for adjusting shading data in accordance with a change in a density of a reference white plate is now described with reference to FIG. 2. Detection and adjustment performed in accordance with density adjustment data of the reference white plate are included in the processes in this embodiment. Initially, the density adjustment data may be used when image data is adjusted in accordance with a change in a density of the reference white plate. The density adjustment data may be represented by a ratio of a density of the reference white plate to that of a reference original as a reference member. A detection device for detecting density adjustment data may be formed from a shading data detection section 211 that is formed by branching off from an output terminal of the shading correction data input route. The shading data detection section 211 detects density data for calculating density adjustment data when both the reference original and white plate are read.

The CPU 21 serving as a controller for controlling the entire image reading apparatus then calculates a density ratio from both density data obtained by the shading data detection section 211 by reading both the reference white plate and reference original. The CPU 21 controls the density ratio as density adjustment data. Specifically, the CPU stores the density adjustment data in the nonvolatile memory 213. Then, the CPU 21 sets the density adjustment data to a prescribed adjustment section by reading it from the nonvolatile memory 213 so as to perform density adjustment when needed.

Figure 4:
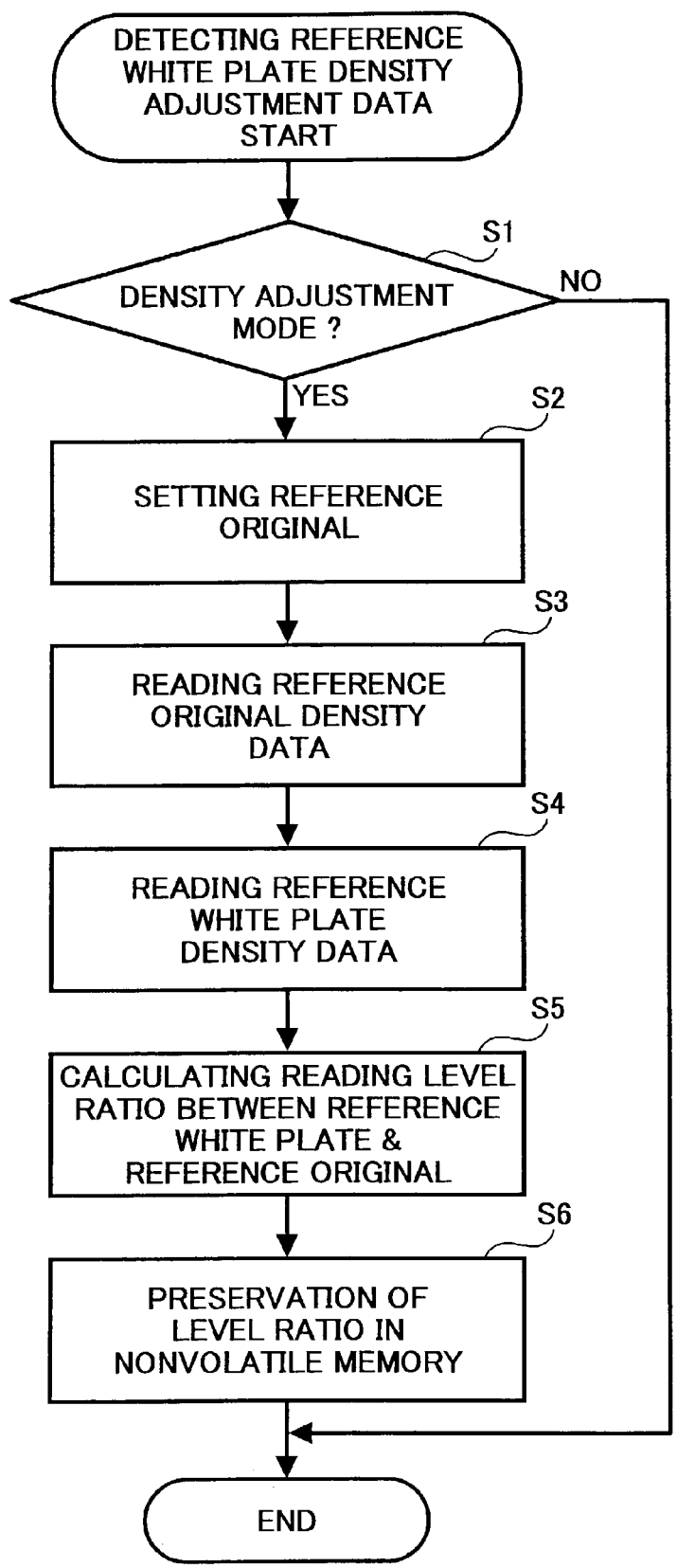
FIG. 4 is a flowchart illustrating a detection process started by an instruction from an operator for detecting density adjustment data.

One exemplary timing of starting detection of the above-described density adjustment data is now described with reference to FIGS. 2 and 4. Since the reference original used when density adjustment data is detected is not always built in an image reading apparatus, the reference original is utilized when needed. Thus, detection may be performed upon instruction from a user or operator such as a service person. For that purpose, the user interface 215 may include a prescribed device for allowing the operator to instruct the image reading apparatus to perform detection through an input operation. Detection of density adjustment data may be started by the instruction of the operator as illustrated in FIG. 4.

Specifically, the CPU 212 initially starts detection of the density adjustment data when the operator instructs execution of a density adjustment mode through the operation panel. Thus, as illustrated in FIG. 4, whether or not it is the density adjustment mode is determined in step S1. If it is the density adjustment mode (YES in step S1), it is determined whether or not the reference original is set on the exposure glass 105 (step S2). Further, because the operator manually sets the reference original, a message may be displayed urging the operator to set the reference original until the original is set. Subsequently, the reference original is read and density data thereof is detected (step S3). Simultaneously, the first carriage 103 is moved to a position where the reference original is set, and the shading gate is asserted in the reference original section timing, and then shading data is generated.

A timing of asserting the shading gate at that time may be different from that when the later described reference white plate 101 is read. The shading data can be optionally detected per pixel for plural lines, and is supplied to an averaging process so as to receive prescribed averaging and obtain density data.

Subsequently, the reference white plate 101 included in the apparatus is read and density data is obtained therefrom (step S4). For that purpose, the first carriage 103 is moved below the reference white plate 101. The shading gate is simultaneously asserted (see FIG. 3). Shading data is then generated. A procedure performed when a shading data detection section 211 detects shading data is similar to that performed when the above-described reference original is detected. After that, the CPU 212 applies an averaging process or the like to the shading data detected by the shading data detection section 211 so as to average the shading data in a prescribed manner.

The CPU 212 then calculates a ratio of a density level of the reference original to that of the reference white plate and vice versa (step S5). Because the density of the reference original gives reference data for adjusting density unevenness caused in the reference white plate, and that of the reference white plate 101 represents density unevenness, the later may be different from the density data of the reference original, for example, in accordance with an elapse of time. Then, density adjustment is performed using the ratio. Further, such density adjustment data is not detected and used until instructed by the operator. Accordingly, the density adjustment data is preferably preserved. In addition, because density adjustment data detection does not necessarily have to be executed every time an electric power source is turned ON, the density adjustment data may be preserved in the nonvolatile memory 213 and read from the memory as necessary. Specifically, density adjustment data detected and calculated may be preserved in the nonvolatile memory 213 (step S6) as illustrated in FIG. 4. The process then ends.

Further, adjustment can be applied to either data read from the reference white plate or image data read from an original in accordance with the above-described density adjustment data. Initially, one example of an adjustment process performed by the circuit of FIG. 2 when the reference white plate is read and shading data is generated therefrom is described. Specifically, a white plate density adjustment section 214 is disposed on the shading correction data input route. The CPU 212 sets the density adjustment data previously obtained to the white plate density adjustment section 214. Then, adjustment is performed in accordance with the set adjustment data.

Specifically, data read from the reference white plate is adjusted by the white plate density adjustment section 214 in the preliminary step to shading data generation.

For example, the reference white pate density adjustment section 214 may apply multiplication or division, (addition and subtraction is also suitable for the approximate calculation) to shading data in accordance with density adjustment data in a prescribed manner. Thus, deviation caused by unevenness of density of the reference white plate in the shading data may be adjusted before the shading correction data is generated. Accordingly, shading correction data input and averaged by the averaging circuit 208 may be normalized.

Figure 5:
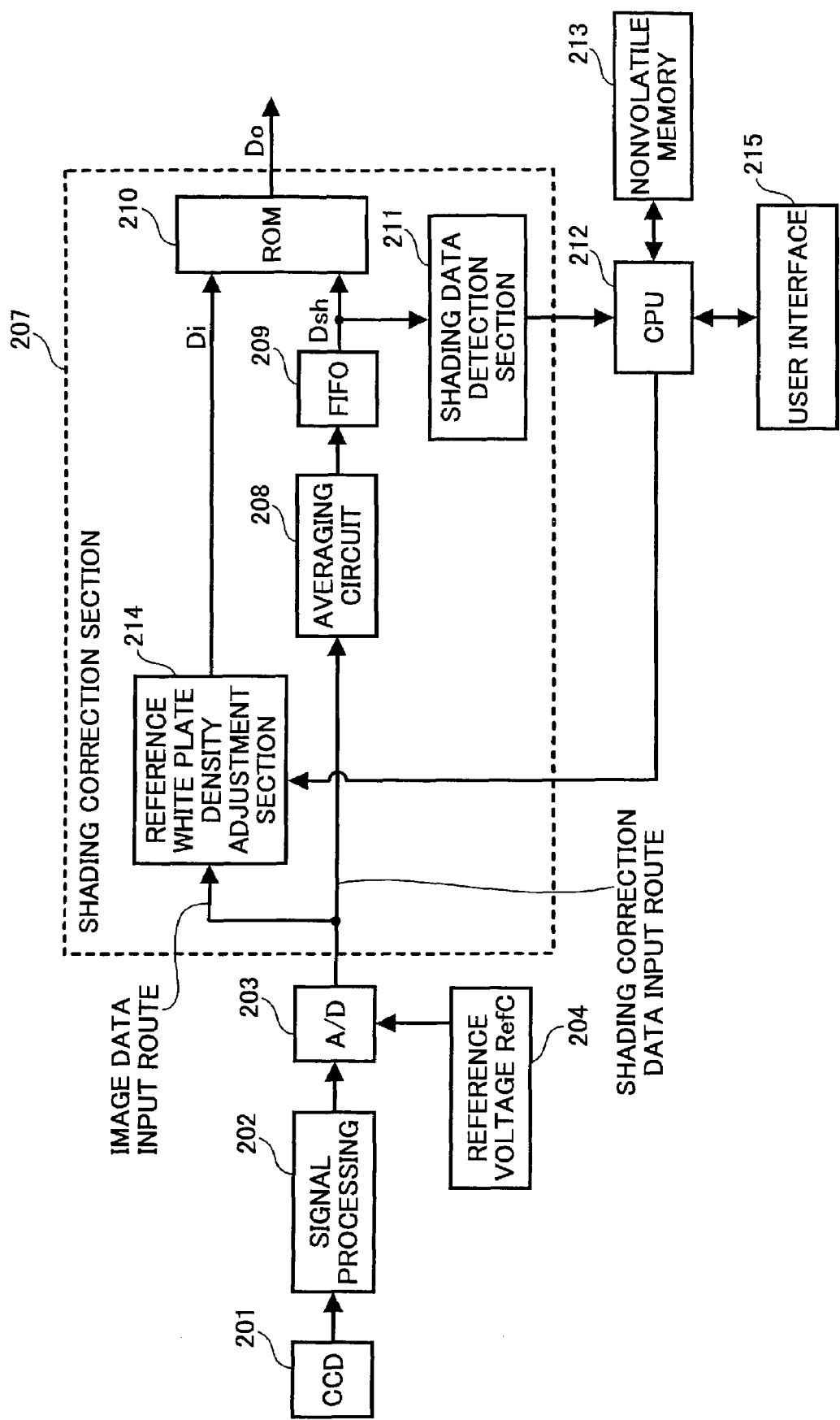
FIG. 5 is a block diagram illustrating another example of an image signal processing section according to the present invention.

One embodiment that adjusts image data obtained from an original image is now described with reference to FIG. 5. Specifically, a reference white plate adjustment section 214 is used on the image data input route as a part of a processing device for processing image data. The CPU 212 sets density adjustment data previously calculated to the reference white plate adjustment section 214.

Then, such density adjustment is performed in accordance with the adjustment data as illustrated in the drawing. When original image data is adjusted, a reciprocal (Dsh_w/Dsh_std) of the ratio shading correction data may be used, because the adjusting can be represented by the following formula:

$$Din(n)' = Din(n) \times (Dsh\_w/Dsh\_std)$$

where Din(n)' represents adjusted data that is read from an original.

However, this embodiment is similar to that of FIG. 2 except for a location of the reference white plate adjustment section 214 that adjusts image data in accordance with the density adjustment data. Specifically, the detection section described with reference to FIGS. 2 to 4 may be converted to this embodiment. Thus, a description about detection of the density adjustment data is not repeated.

Similar to the above-described embodiment, original image data read and input may be adjusted in accordance with the adjustment data. The reference white plate density adjustment section 214 may apply multiplication or division (addition and subtraction is also suitable for approximate calculation) to the image data in accordance with the density adjustment data set thereto. Thus, image data may be input to the ROM 210 with a deviation caused by reference white plate density unevenness, for example, being adjusted. Then, shading correction may be performed therein. Thereby, an output to the utility instrument may be corrected. The exemplary reference white plate adjustment section 214 is disposed in an input stage on the image data input route of the embodiment of FIG. 5. However, the reference white plate adjustment section can be disposed in an output stage, namely an output side of the ROM 210.

In the above-described embodiment, any one of multiplication, division, addition, and subtraction may be used to perform the adjustment calculation using the density adjustment data. The multiplication and division may be performed by a conventional coefficient calculation, thereby achieving a more correct result. In contrast, addition and subtraction (i.e., $Dsh(n)' = Dsh(n) + (Dsh\_std - Dsh\_w)$) is preferably performed if a shading correction data distribution is almost uniform, whereas a problem does not occur if multiplication and division having complex and large process load are replaced therewith. As a result, shading correction precision is not impaired, and a circuit configuration may be simplified.

One embodiment of checking for abnormal density adjustment data is now described. When density adjustment data is detected and does not fall within a prescribed range previously set as an allowable limit (for example, when unevenness of density of the reference white plate ranges is +−10%, the adjustment value should be from about 0.9 to about 1.1), the abnormal data probably comes from a hardware abnormality.

In such a situation, the CPU 212 may compare the density adjustment value with the prescribed allowable range so that a density adjustment value detection error can be checked, and then determine if the density adjustment value deviates from the range. Further, by determining a detection error of the adjustment value, and displaying an abnormality on an operation panel of a user interface, the CPU 212 can inform an operator of the abnormality, so that the operator can take an appropriate countermeasure against the error and prevent reading errors.

In addition, the above-described several embodiments rely upon the adjustment being performed by the apparatus side. However, image data may be adjusted in accordance with a designated value by an operator. Specifically, a prescribed manual setting device capable of reflecting an intent of the operator to output data may be used. The prescribed manual setting device may be provided so as to allow an operator to optional set density adjustment data, which is set to the reference white plate density adjustment section 214 by the CPU 212 through the input operation panel of the user interface 215 in a manual setting mode. By furnishing such a prescribed device, appropriate data read from a particular original and operator desired data may be obtained.

Figure 6:
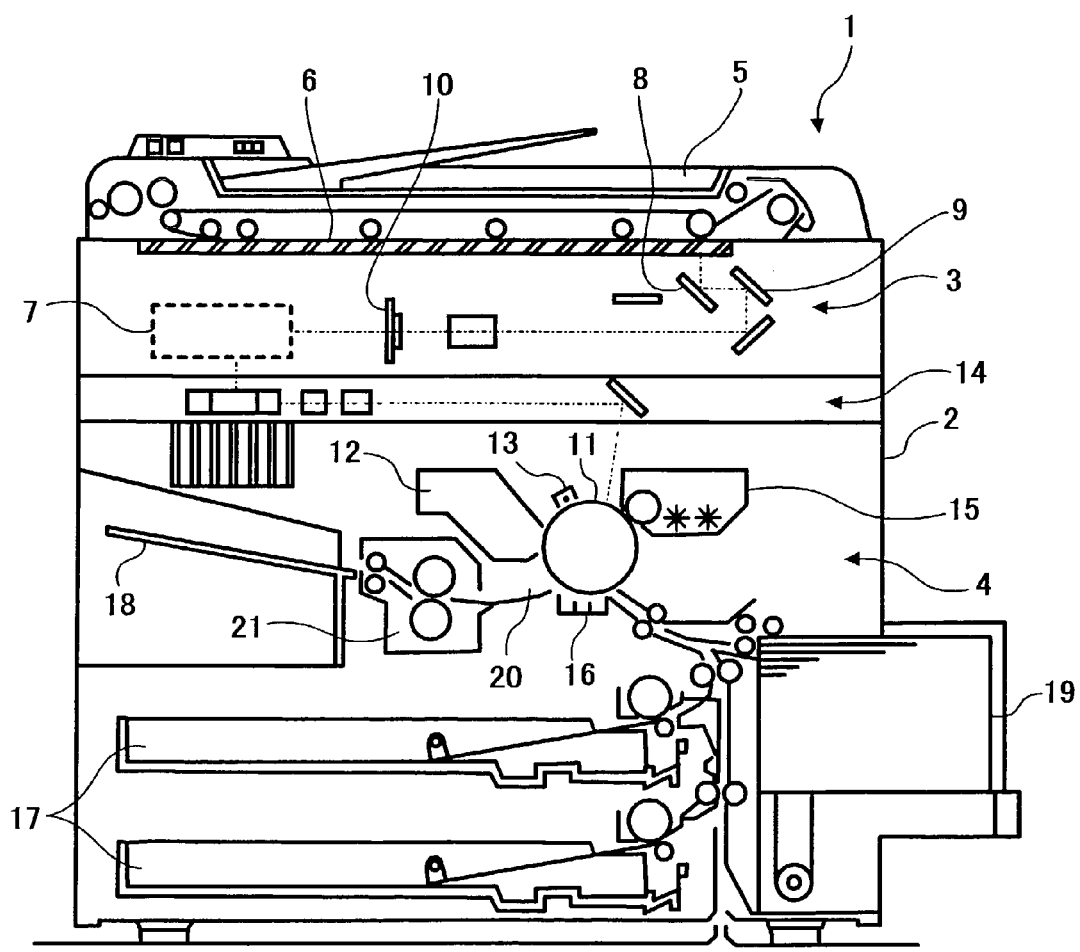
FIG. 6 is a schematic diagram illustrating another example of the image reading apparatus provided in a DPPC according to the present invention.

One embodiment of an image forming apparatus using the above-described image reading apparatus and an image formation device for forming an image in accordance with image data output from the image reading apparatus is now described with reference to FIG. 6. This embodiment includes a DPPC (a digital Plane Paper Copier i.e., a digital copier) to which the present invention is applied. FIG. 6 illustrates a schematic view of the entire configuration of the DPPC. As illustrated in FIG. 6, an apparatus body 2 of the DPPC 1 includes a scanner section 3 similar to that of FIG. 1 as an image reading apparatus and a printer section 4 as an image duplicating device.

An ADF (Automatic Document Feeder) unit serving as a document transportation mechanism is engaged with the scanner section 3. As shown, the scanner section 3 includes an exposure glass 6 similar to table glass 105 of FIG. 1 and a first mirror 8 disposed opposite to an original surface via the exposure glass for perpendicularly deflecting light reflected from an original. Also included is a second mirror 9 for returning a reflection light path from the first mirror 8. In addition, a CCD line image sensor 10 is arranged on the reflection light path originated from the second mirror 9 so as to apply photoelectric transfer to an image 25 transmitted through an imaging lens.

The CCD sensor 10 converts an imaged image into an image signal while sensor elements perform main scanning in a line direction (i.e., a vertical direction to a surface of FIG. 6). In addition, the scanner section reads a reference white plate 25 similar to the plate 101 of FIG. 1 together with the original. The reference white plate 25 is arranged in substantially the same level so as to enable the scanner to equally read the reference white plate 25 and original surface. Data read from the reference white plate 25 is utilized for generating shading data for processing image data read from the original.

Image data read by the CCD sensor 10 is input to a control section 7 serving as a processing device of image data. The control section 7 applies the A/D conversion to image data, and applies digital processing such as correction, adjustment, etc., to the digital signal. The control section 7 then outputs the image data to an optical writing section 14 including a laser light output apparatus, which modulates an optical output of a laser diode or the like in accordance with the image data, and a polygon mirror.

The printer section 4 includes a photoconductive drum 11. Also included is a toner cleaner 12, a charger 13, a developing device 15, and a transfer device 16, respectively arranged around and opposing to the PC drum one by one. The charger 13 discharges the PC drum 11 arranged in the printer section 4. A laser light carrying image information is irradiated to the PC drum 11 from the writing section 14. Thereby, a latent image formed on the surface of the PC drum 11. The developing device 15 stores and adheres toner to the surface of the PC drum 11 carrying the latent image, thereby visualizing the latent image as a toner image.

A sheet feeding section includes a large capacity sheet tray 19 and cassettes 17 accommodating various sized small numbers of sheets. A sheet transportation mechanism is also included so as to sequentially transport printing sheets from these cassettes toward a sheet ejection tray 18. A sheet transportation path 20 extends from a gap formed between the PC drum 11 and transfer device 15 to an interior of a fixing device 21.

The transfer device 16 transfers a toner image formed on the PC drum onto the printing sheet transported by the sheet transportation mechanism. The printing sheet carrying the transferred toner image is further transported by the sheet transportation mechanism to the fixing device 21. Then, the toner image is fixed into the printing sheet. The printing sheet is then ejected onto the sheet ejection tray 18. Further, an operation panel (not shown) is arranged on the upper surface of the apparatus body 2 so as to allow and display various data input.

Obviously, numerous additional modifications and variations of the present invention are possible in light of e above teachings. It is therefore to be understood that within the scope of the appended claims, the present invention may be practiced otherwise than as specifically described herein.

What is claimed:

1. An image reading apparatus, comprising:
   an image sensor configured to receive light and output an image signal in accordance with image data carried in the light;
   an A/D converter configure to convert the image signal into a digital signal with reference to a reference voltage;
   a reference white plate configured to be read so as to generate density data;
   a correction device configured to correct the digital signal in accordance with shading data;
   a reference member configured to be read so as to define a readable density limit, said readable density limit correcting density data obtained by reading the reference white plate;
   a detection device configured to detect a ratio of density of the reference white plate to density of the reference member as density adjustment data, said density being obtained by reading the respective reference member and reference white plate in substantially a same exposure condition; and
   a control device configured to control the correction device to adjust a density of the digital signal in accordance with the density adjustment data.

2. The image reading apparatus according to claim 1, further comprising a nonvolatile memory configured to store the density adjustment data.

3. The image reading apparatus according to claim 1, wherein said correction device adjusts the shading data in accordance with the density adjustment data and performs shading correction and shading correction.

4. The image reading apparatus according to claim 3, further comprising a multiplication and division circuit configured to perform the adjustment of shading data by the correction device.

5. The image reading apparatus according to claim 3, further comprising an addition and subtraction circuit.

6. The image reading apparatus according to claim 5, further comprising an addition and subtraction circuit.

7. The image reading apparatus according to claim 1, further comprising:
   a user interface configured to operate the image reading apparatus; and
   a detection mode starting device configured to start a detection mode so as to detect the density adjustment data through an operation of the user interface.

8. The image reading apparatus according to claim 1, further comprising a determining device configured to determine an abnormality of the reference white plate, said abnormality being detected when the density adjustment data is larger than a prescribed value.

9. The image reading apparatus according to claim 8, further comprising a display configured to display a result of the determination of abnormality on a user interface.

10. The image reading apparatus according to claim 1, wherein density adjustment data is manually set through a user interface.

11. The image reading apparatus according to claim 1, wherein said correction device performs shading correction and adjusts image data obtained from an original before or after shading correction in accordance with the density adjustment data.

12. The image reading apparatus according to claim 11, further comprising a multiplication and division circuit configured to perform the adjustment of shading data by the correction device.

13. An image forming system, comprising:
   an image reading apparatus including
      an image sensor configured to receive light and output an image signal in accordance with image data carried in the light,
      an A/D converter configure to convert the image signal into a digital signal with reference to a reference voltage,
      a reference white plate configured to be read so as to generate density data,
      a correction device configured to correct the digital signal in accordance with shading data,
      a reference member configured to be read so as to define a readable density limit, said readable density limit correcting density data obtained by reading the reference white plate,
      a detection device configured to detect a ratio of density of the reference white plate to density of the reference member as density adjustment data, said density being obtained by reading the respective reference member and reference white plate in substantially a same exposure condition, and
      a control device configured to control the correction device to adjust a density of the digital signal in accordance with the density adjustment data; and
   an image formation apparatus configured to form an image in accordance with an output of the image reading apparatus.

14. The image forming system according to claim 13, wherein the image reading apparatus further comprises a nonvolatile memory configured to store the density adjustment data.

15. The image forming system according to claim 13, wherein said correction device adjusts the shading data in accordance with the density adjustment data and performs shading correction and shading correction.

16. The image forming system according to claim 15, wherein the image reading apparatus further comprises a multiplication and division circuit configured to perform the adjustment of shading data by the correction device.

17. The image forming system according to claim 15, wherein the image reading apparatus further comprises an addition and subtraction circuit.

18. The image forming system according to claim 17, wherein the image reading apparatus further comprises an addition and subtraction circuit.

19. The image forming system according to claim 13, wherein the image reading apparatus further comprises,
  a user interface configured to operate the image reading apparatus; and
  a detection mode starting device configured to start a detection mode so as to detect the density adjustment data through an operation of the user interface.

20. The image forming system according to claim 13, wherein the image reading apparatus further comprises a determining device configured to determine an abnormality of the reference white plate, said abnormality being detected when the density adjustment data is larger than a prescribed value.

21. The image forming system according to claim 20, wherein the image reading apparatus further comprises a display configured to display a result of the determination of abnormality on a user interface.

22. The image forming system according to claim 13, wherein density adjustment data is manually set through a user interface.

23. The image forming system according to claim 13, wherein said correction device performs shading correction and adjusts image data obtained from an original before or after shading correction in accordance with the density adjustment data.

24. The image forming system according to claim 23, wherein the image reading apparatus further comprises a multiplication and division circuit configured to perform the adjustment of shading data by the correction device.

25. An image reading apparatus, comprising:
  image sensor means for receiving light and output an image signal in accordance with image data carried in the light;
  A/D converter means for converting the image signal into a digital signal with reference to a reference voltage;
  reference white plate means for reading so as to generate density data;
  correction means for correcting the digital signal in accordance with shading data;
  reference means for being read so as to define a readable density limit, said readable density limit correcting density data obtained by reading the reference white plate means;
  detection means for detecting a ratio of density of the reference white plate means to density of the reference means as density adjustment data, said density being obtained by reading the respective reference means and reference white plate means in substantially a same exposure condition; and
  control means for controlling the correction device to adjust a density of the digital signal in accordance with the density adjustment data.

26. The image reading apparatus according to claim 25, further comprising memory means for storing the density adjustment data.

27. The image reading apparatus according to claim 25, wherein said correction means adjusts the shading data in accordance with the density adjustment data and performs shading correction and shading correction.

28. The image reading apparatus according to claim 27, further comprising multiplication and division means for performing the adjustment of shading data by the correction means.

29. The image reading apparatus according to claim 27, further comprising addition and subtraction means.

30. The image reading apparatus according to claim 29, further comprising addition and subtraction circuit means.

31. The image reading apparatus according to claim 25, further comprising:
  user interface means for operating the image reading apparatus; and
  detection mode starting means for starting a detection mode to detect the density adjustment data through an operation of the user interface means.

32. The image reading apparatus according to claim 25, further comprising determining means for determining an abnormality of the reference white plate means, said abnormality being detected when the density adjustment data is larger than a prescribed value.

33. The image reading apparatus according to claim 32, further comprising display means for displaying a result of the determination of abnormality on a user interface means.

34. The image reading apparatus according to claim 25, wherein density adjustment data is manually set through user interface means for operating the image reading apparatus.

35. The image reading apparatus according to claim 25, wherein said correction means performs shading correction and adjusts image data obtained from an original before or after shading correction in accordance with the density adjustment data.

36. The image reading apparatus according to claim 35, further comprising multiplication and division means for performing the adjustment of shading data by the correction means.

* * * * *